US009641774B2

(12) United States Patent
Shishido et al.

(10) Patent No.: US 9,641,774 B2
(45) Date of Patent: May 2, 2017

(54) SOLID-STATE IMAGING DEVICE AND IMAGING DEVICE

(71) Applicant: Panasonic Intellectual Property Management Co., Ltd., Osaka (JP)

(72) Inventors: Sanshiro Shishido, Osaka (JP); Masahiro Higuchi, Hyogo (JP); Dai Ichiryu, Osaka (JP); Kazuko Nishimura, Kyoto (JP); Yutaka Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/073,600

(22) Filed: Mar. 17, 2016

(65) Prior Publication Data

US 2016/0205333 A1    Jul. 14, 2016

Related U.S. Application Data

(63) Continuation of application No. PCT/JP2014/003029, filed on Jun. 6, 2014.

(30) Foreign Application Priority Data

Nov. 29, 2013  (JP) ................................ 2013-247364

(51) Int. Cl.
*H04N 5/335*    (2011.01)
*H04N 5/357*    (2011.01)
(Continued)

(52) U.S. Cl.
CPC ............ *H04N 5/357* (2013.01); *H04N 5/243* (2013.01); *H04N 5/3658* (2013.01);
(Continued)

(58) Field of Classification Search
None
See application file for complete search history.

(56) References Cited

U.S. PATENT DOCUMENTS

| 2005/0168251 A1 | 8/2005 | Lim |
| 2013/0206961 A1 | 8/2013 | Ikeda et al. |
| 2013/0215302 A1 | 8/2013 | Ueno |

FOREIGN PATENT DOCUMENTS

| JP | 2005-218117 | 8/2005 |
| JP | 2006-109117 | 4/2006 |

(Continued)

OTHER PUBLICATIONS

International Search Report of PCT application No. PCT/JP2014/003029 dated Jul. 15, 2014.

*Primary Examiner* — Stephen Coleman
(74) *Attorney, Agent, or Firm* — McDermott Will & Emery LLP (57) ABSTRACT

A solid-state imaging device that suppresses streaking includes an imaging region in which unit cells are aligned in matrix, an A/D converter for converting an analog signal generated in the imaging region to a digital signal, and a ramp buffer having an input terminal and an output terminal. Ramp voltage is input to the input terminal, and a reference signal having the ramp voltage is output from the output terminal toward the A/D converter. The A/D converter includes a comparator disposed in each column for comparing an analog signal with a reference signal, and a counter disposed corresponding to the comparator for counting a comparison period of the comparator. The ramp buffer includes a feedback circuit for simultaneously outputting the reference signal to the multiple comparators and controlling the amount of current flowing to the output terminal according to the ramp voltage of the reference signal output from the terminal.

10 Claims, 8 Drawing Sheets

(51) Int. Cl.
*H04N 5/378* (2011.01)
*H04N 5/243* (2006.01)
*H04N 5/3745* (2011.01)
*H04N 5/365* (2011.01)
*H04N 5/374* (2011.01)

(52) U.S. Cl.
CPC .............. *H04N 5/374* (2013.01); *H04N 5/378* (2013.01); *H04N 5/37452* (2013.01); *H04N 5/37455* (2013.01)

(56) References Cited

FOREIGN PATENT DOCUMENTS

| | | |
|---|---|---|
| JP | 2013-102312 | 5/2013 |
| JP | 2013-168880 | 8/2013 |
| JP | 2013-179577 | 9/2013 |

SOLID-STATE IMAGING DEVICE AND IMAGING DEVICE

TECHNICAL FIELD

The present invention relates to a solid-state imaging device and imaging device.

BACKGROUND ART

Figure 8:
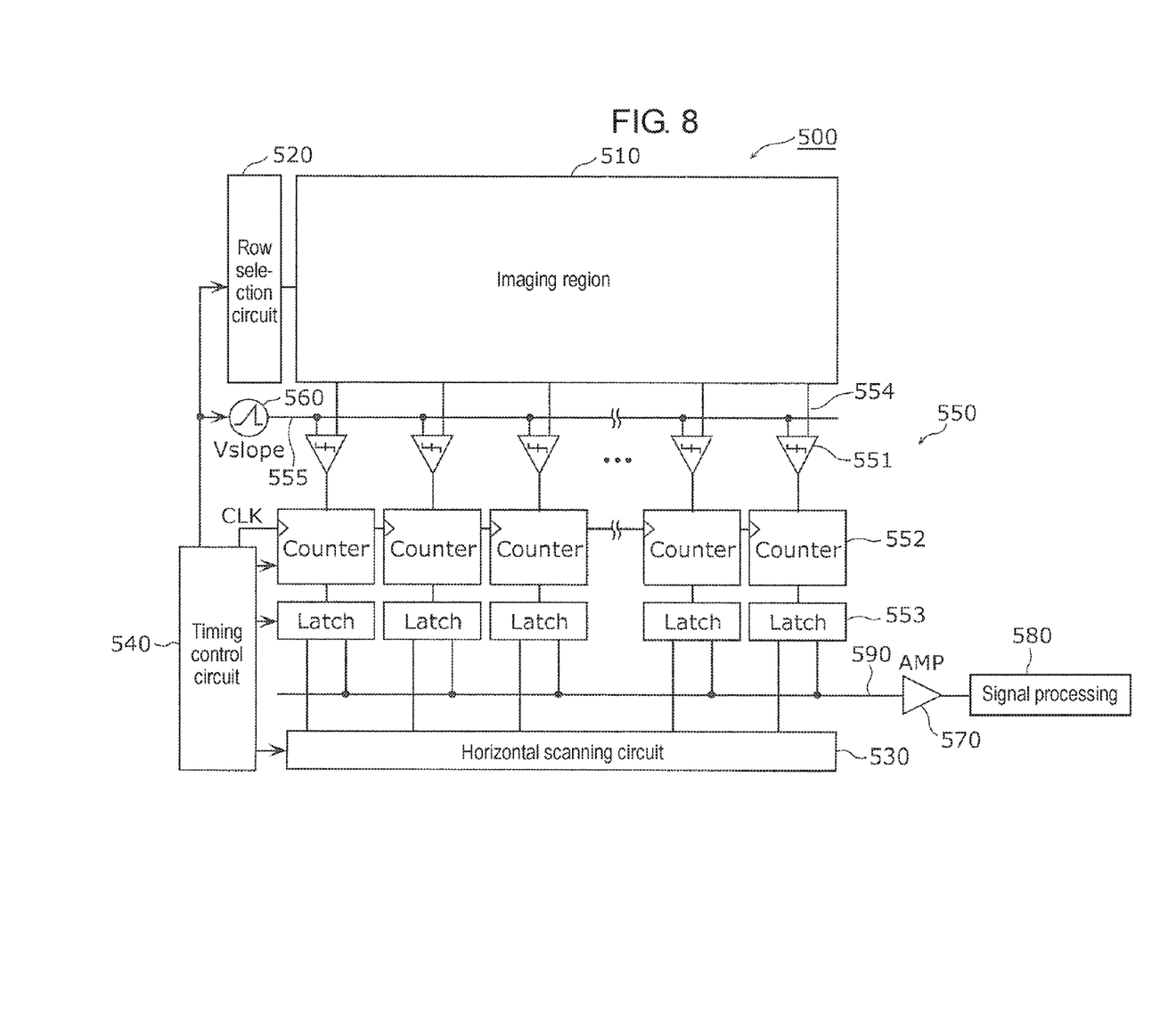
FIG. 8 is a block diagram of a conventional solid-state imaging device disclosed in PTL1.

FIG. 8 is a block diagram of a conventional solid-state imaging device disclosed in PTL1. Solid-state imaging device 500 in the figure includes imaging region 510, row selection circuit 520, horizontal scanning circuit 530, timing control circuit 540, ADC group 550, digital-analog converter (DAC) 560 as a ramp signal generator, amplifier circuit 570, signal processing circuit 580, and horizontal transmission line 590. Single slope column-parallel ADC including comparator 551, counter 552, and latch circuit 553 is aligned in multiple columns in ADC group 550.

Comparator 551 compares ramp voltage Vslope that has stepwise ramp waveform output from DAC 560 via ramp signal line 555 with an analog signal output from pixel per row via vertical signal line 554. Counter 552 counts comparison time of comparator 551. By the above operation of comparator 551 and counter 552, ADC group 550 outputs a pixel signal as digital data. The above ADC system is called a single slope column-parallel ADC system.

CITATION LIST

Patent Literature

PTL1 Japanese Patent Unexamined Publication No. 2013-168880

SUMMARY OF THE INVENTION

In the aforementioned single slope column-parallel ADC system, comparator 551 compares ramp voltage Vslope that will be a reference potential with signal voltage (analog signal) from pixel to perform A/D conversion by controlling the downstream counter 552. Since the single slope ADC of a CMOS image sensor reads out a pixel signal after parallel processing in each column, many comparators 551 are provided in the row direction.

The above ramp voltage Vslope is commonly input to comparator 551 disposed in columns (all comparators 551 coupled to ramp signal line 555 in FIG. 8) via ramp signal line 555. Therefore, A/D conversion in one comparator 551 in the column is assumed to vary ramp voltage Vslope on ramp signal line 555. This causes error in A/D conversion in other comparators 551 coupled to the same ramp signal line.

In the CMOS image sensor, if there is a region that has large local luminance difference in an imaging region, the operation of a comparator in the column, including this luminance difference, induces error in A/D conversion in other comparator in a region with other luminance difference, resulting in degrading the image quality. Hereafter, this phenomenon is called "streaking."

The present invention takes into account the above disadvantage, and aims to offer a solid-state imaging device and an imaging device that can suppress streaking.

To solve the above disadvantage, a solid-state imaging device in an exemplary embodiment of the present invention includes a pixel section in which multiple pixels for conducting photoelectric conversion are aligned in matrix, an A/D converter for converting a pixel signal generated in the pixel section from an analog signal to digital signal in multiple pixel units, and a buffer circuit that has an input terminal and an output terminal. Ramp voltage is input to the input terminal, and the buffer circuit outputs a reference signal having the ramp voltage from the output terminal to the A/D converter. The A/D converter includes a comparator disposed in each pixel column for comparing the analog signal for each pixel with the reference signal, and a counter latch disposed corresponding to the comparator for counting a period that the comparator compares the analog signal with the reference signal, and retaining the digital signal corresponding to the period. The buffer circuit includes a feedback circuit for simultaneously outputting the reference signal to the multiple comparators, and controlling the amount of current flowing to the output terminal according to the ramp voltage of the reference signal output from the output terminal.

In this configuration, the buffer circuit to which the feedback circuit is added can reduce output impedance while suppressing an increase in current and area, compared to a buffer circuit without feedback circuit. Accordingly, streaking can be reduced while suppressing an increase in power consumption, so as to improve the picture quality.

Still more, a solid-state imaging device in an exemplary embodiment of the present invention includes a pixel section in which multiple pixels for conducting photoelectric conversion are aligned in matrix, an A/D converter for converting a pixel signal generated in the pixel section from an analog signal to digital signal in multiple pixel units, a ramp generation circuit for generating ramp voltage, and a buffer circuit having an input terminal and an output terminal. The ramp voltage generated in the ramp generation circuit is input to the input terminal and a reference signal having the ramp voltage is output from the output terminal toward the A/D converter. The A/D converter includes a comparator disposed in each pixel column for comparing the analog signal with the reference signal for each of the pixels, and a counter latch disposed corresponding to the comparator for counting a period in which the comparator compares the analog signal with the reference signal and retaining the digital signal for the counted period. At least the buffer circuit or the ramp generation circuit is provided in plural number, and the input terminals of the comparators and the output terminal of the buffer circuit are coupled by a common ramp signal line.

With this configuration, effective wiring impedance and output impedance of the buffer circuit can be reduced by using at least the multiple ramp generation circuits or the multiple buffer circuits to simultaneously supply the ramp voltage to the multiple comparators. Accordingly, wiring load is reduced, and thus streaking can be reduced.

For example, the buffer circuit includes a feedback circuit for controlling the amount of current flowing to the output terminal according to the ramp voltage of the reference signal output from the output terminal.

Still more, for example, the comparator includes a first input terminal to which the reference signal is input, and a second input terminal to which the analog signal is input. The solid-state imaging device further includes a first ramp signal line coupling the output terminal of the first buffer circuit and the first input terminal of the comparator, a second ramp signal line coupling the output terminal of the second buffer circuit and the first input terminal of the comparator, a first capacitive element inserted in series between the first ramp signal line and the first input terminal of the comparator, and a second capacitive element inserted in series between the second ramp signal line and the first input terminal of the comparator.

For example, the ramp generation circuit and the buffer circuit are coupled via the capacitive element.

Still more, for example, the buffer circuit includes n-type input transistor whose gate is coupled to the input terminal of the buffer circuit and a source is coupled to the output terminal of the buffer circuit, an n-type current source load transistor whose drain is coupled to the source of the input transistor and a source is grounded, a p-type current source transistor whose source is coupled to the power source and a drain is coupled to a drain of the input transistor, and a p-type feedback transistor whose gate is coupled to the drain of the input transistor, a source is coupled to the power source, and a drain is coupled to the output terminal of the buffer circuit. The input transistor and the current source load transistor configure a source follower circuit. The current source transistor and the feedback transistor configure the feedback circuit.

Furthermore, for example, the buffer circuit is disposed adjacent to the comparator.

The present invention can achieve a solid-state imaging device having the above characteristic configuration, and also an imaging device equipped with this solid-state imaging device.

The solid-state imaging device and the imaging device of the present invention reduce impedance between the ramp generation circuit and the comparator, and can thus reduce streaking. Accordingly, the present invention can improve the picture quality.

DESCRIPTION OF EMBODIMENTS (Knowledge Underlying the Present Invention)

The inventors find the following disadvantages of the conventional solid-state imaging device described in the Background Art.

To reduce streaking of the aforementioned solid-state imaging device, fluctuation of ramp voltage due to the operation of comparator needs to be reduced. Reduction of impedance between the ramp generation circuit and comparator is effective for reducing fluctuation of ramp voltage. Impedance between the ramp generation circuit and comparator is divided into a wiring impedance component of a ramp signal line coupling the ramp generation circuit and comparator, and an output impedance component of the ramp generation circuit.

The wiring impedance component increases in proportion to the horizontal size of imaging region. Therefore, in particular, contribution of wiring impedance component to streaking is high in a CMOS image sensor using high pixel counts or large pixels. Reduction of the wiring impedance component is thus an important task. One known method of improving streaking by reducing the wiring impedance component is to dispose a circuit for buffering ramp voltage near the input of each comparator. In this method, impedance between the buffer and comparator is reduced by providing a buffer circuit to each comparator, so as to suppress fluctuation of ramp voltage due to the operation of the comparator. However, this method has disadvantages of degraded noise characteristic, enlarged area, and increased power consumption due to insertion of the buffer circuit.

Alternatively, there is a method of reducing the output impedance component of the ramp generation circuit. In the ramp generation circuit configured with current source and resistance, a resistance value of the resistance is equivalent to output impedance. Therefore, to reduce the output impedance, this resistance value needs to be reduced. However, to retain a ramp waveform, current fed to the resistance needs to be increased for an amount of reduced resistance. As a result, current consumption increases. Another method is to provide a buffer for ramp output on the side of the ramp generation circuit and apply ramp voltage to the comparator. However, to reduce output impedance of the buffer, current to the buffer output stage needs to be increased. This also results in increased power consumption.

To solve these disadvantages, a solid-state imaging device in an exemplary embodiment of the present invention includes a pixel section in which multiple pixels for conducting photoelectric conversion are aligned in matrix, an A/D converter for converting a pixel signal generated in the pixel section from an analog signal to digital signal in multiple pixel unit, and a buffer circuit having an input terminal and an output terminal. Ramp voltage is input to this input terminal, and a reference signal having the ramp voltage is output from this output terminal toward the A/D converter. The A/D converter includes a comparator provided in each pixel column for comparing the analog signal with the reference signal for each pixel, and a counter latch disposed corresponding to the comparator for counting a period that the comparator compares the analog signal with digital signal and retaining the digital signal corresponding to the period. The buffer circuit includes a feedback circuit for simultaneously outputting the reference signal to the multiple comparators and controlling the amount of current flowing to the output terminal according to the ramp voltage of the reference signal output from the output terminal.

The exemplary embodiment can suppress streaking without increasing power consumption.

The solid-state imaging device and an imaging device in exemplary embodiments of the present disclosure are described below with reference to drawings. It is apparent that the following exemplary embodiments are examples of the present invention, and thus values, shapes, materials, components, positional layout and connection of components, steps, sequence of steps, and so on give no limitation to the present invention.

First Exemplary Embodiment

A solid-state imaging device in the first exemplary embodiment has a configuration of a CMOS image sensor of single-slope column-parallel A/D conversion type.

Figure 1:
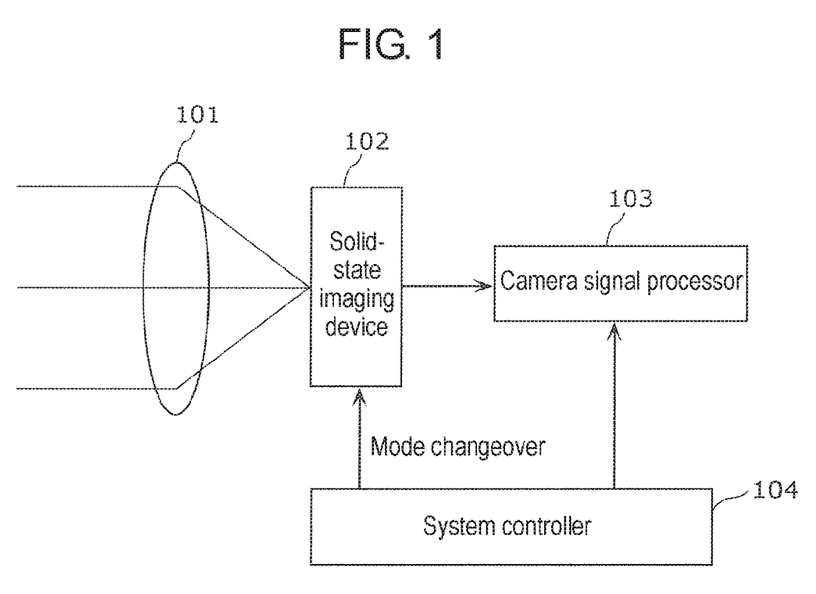
FIG. 1 is an example of a configuration of an imaging device (camera) in accordance with a first exemplary embodiment.
Figure 2:
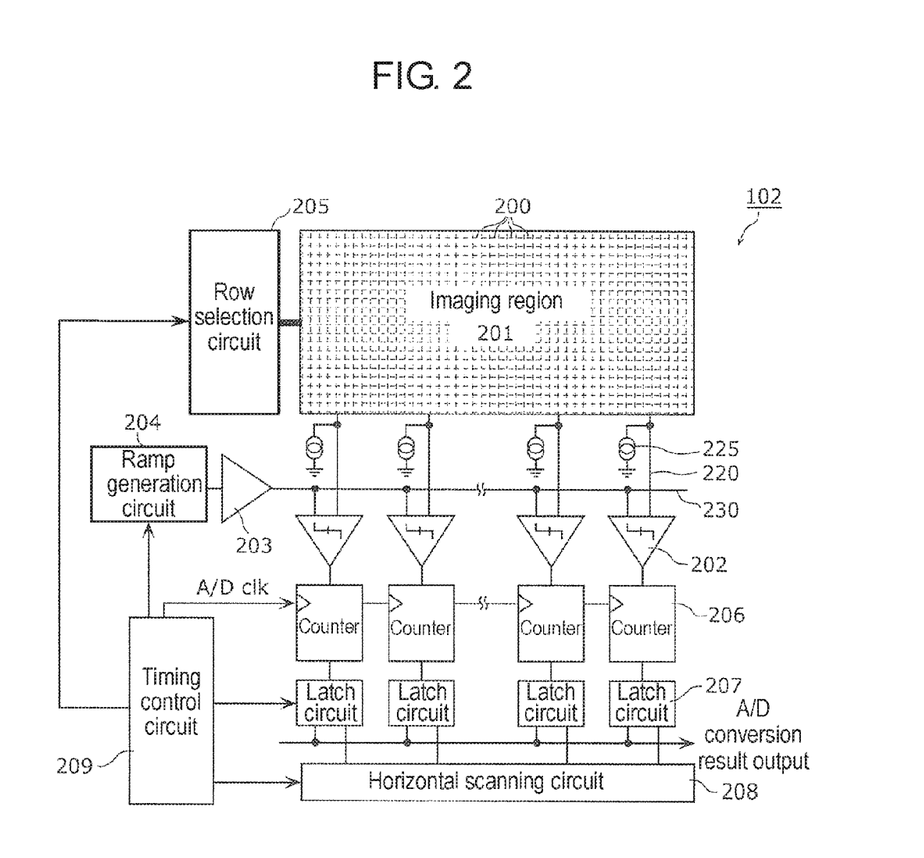
FIG. 2 is a block diagram of a solid-state imaging device in accordance with the first exemplary embodiment.

FIG. 1 is an example of the configuration of the imaging device (camera) in the first exemplary embodiment. FIG. 2 is a block diagram of the solid-state imaging device in the first exemplary embodiment.

[Configuration of Imaging Device (Camera)]

As shown in FIG. 1, the imaging device (camera) in the exemplary embodiment includes lens 101, solid-state imaging device 102, camera signal processor 103, and system controller 104. Lens 101 is an optical system that guides an incident light to a pixel region of solid-state imaging device 102 (forms an image of subject). For example, it is a lens that forms an image of the incident light (image light) on an imaging face.

Solid-state imaging device 102 outputs an image signal obtained by converting the image light formed on the imaging face by lens 101 to an electric signal by the pixel.

Camera signal processor 103 performs a range of types of signal processing on the image signal output from solid-state imaging device 102.

System controller 104 controls solid-state imaging device 102 and camera signal processor 103.

The image signal processed in the camera signal processor 103 is recorded on a recording medium, such as a memory. Image information recorded on the recording medium is printed in a hard copy, such as by a printer. Or, the image signal processed by camera signal processor 103 is projected on a monitor, such as a liquid crystal display, as a moving picture.

[Configuration of Solid-State Imaging Device]

As shown in FIG. 2, solid-state imaging device 102 includes imaging region 201, vertical signal line 220, comparator 202, load current source 225, ramp buffer 203, ramp generation circuit 204, row selection circuit 205, counter 206, latch circuit 207, horizontal scan circuit 208, and timing control circuit 209. Comparator 202, load current source 225, counter 206, and latch circuit 207 configure an A/D converter. The A/D converter converts the pixel signal generated in imaging region 201 from an analog signal to a digital signal in units of multiple pixels.

Imaging region 201 is a pixel section in which multiple unit cells 200 are aligned in matrix.

Vertical signal line 220 is commonly coupled to multiple unit cells 200 in each column.

Comparator 202 is disposed in each column, and coupled to vertical signal line 220 disposed in the column, and compares the analog signal from unit cell 200 with a reference signal output from ramp buffer 203.

Load current source 225 is disposed in each column, and coupled to vertical signal line 220 disposed in the column.

Ramp buffer 203 is commonly coupled to comparator 202 disposed in each column via ramp signal line 230. Ramp buffer 203 is a buffer circuit that has an input terminal and an output terminal. Ramp voltage from ramp generation circuit 204 is input to the input terminal, and the reference signal with the ramp voltage is output from the output terminal toward the A/D converter. Ramp buffer 203 in the exemplary embodiment includes a feedback circuit that simultaneously outputs the reference signal to multiple comparators 202, and controls the amount of current flowing to the output terminal according to the ramp voltage of the reference signal output from the output terminal.

Ramp generation circuit 204 generates ramp voltage, and is coupled to ramp buffer 203.

Row selection circuit 205 controls row address and row scan.

Counter 206 and latch circuit 207 are disposed corresponding to comparator 202. They configure a counter latch that counts a period in which comparator 202 compares the analog signal with the reference signal, and retains the digital signal corresponding to this period.

[Circuit Diagram of Unit Cell]

Figure 3:
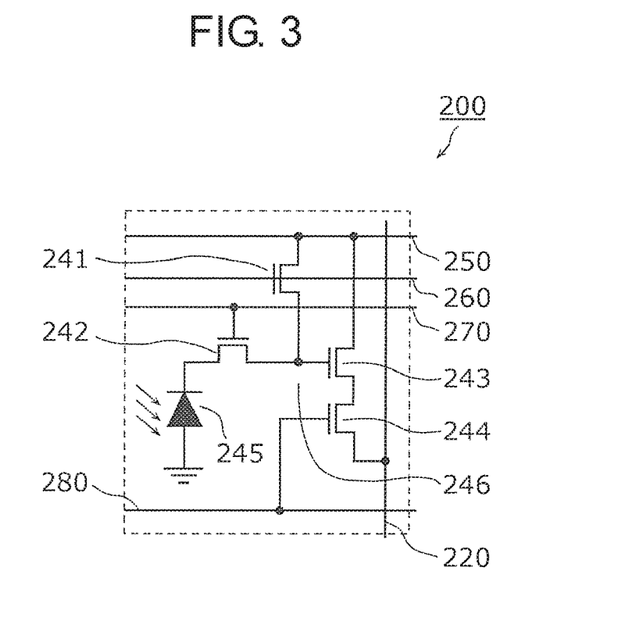
FIG. 3 is an example of a circuit diagram of unit cell in accordance with the first exemplary embodiment.

FIG. 3 is an example of the circuit diagram of unit cell in the first exemplary embodiment. As shown in FIG. 3, unit cell 200 includes photo diode 245, transfer transistor 242, reset transistor 241, source follower transistor 243, floating diffusion 246, and selection transistor 244.

Photo diode 245 is a photoelectric conversion element for converting light from a target to electric charge. It is a basic component of the pixel. An anode of photo diode 245 is set to ground potential, and its cathode is coupled to a source of transfer transistor 242. A drain of transfer transistor 242 is coupled to a source of reset transistor 241 and a gate of source follower transistor 243. This coupling point becomes floating diffusion 246. A source of source follower transistor 243 is coupled to a drain of selection transistor 244, and a source of selection transistor 244 is coupled to vertical signal line 220.

Power signal line 250, reset signal line 260, transfer signal line 270, and selection signal line 280 are wired in each row in horizontal direction so that each unit cell 200 is coupled in the line direction. In addition, vertical signal line 220 is wired in each column in the vertical direction so that each unit cell 200 is coupled in the column direction.

Power source signal line 250 is coupled to a drain of source follower transistor 243 and a drain of reset transistor 241. Transfer signal line 270 is coupled to a gate of transfer transistor 242. Reset signal line 260 is coupled to a gate of reset transistor 241. Selection signal line 280 is coupled to a gate of selection transistor 244.

Unit cell 200 may include multiple photo diodes. Therefore, imaging region 201 can also be called a pixel section in which multiple photo diodes for conducting photoelectric conversion are aligned in matrix.

[Reading Operation of Unit Cell]

Comparator 202 compares the analog signal from unit cell 200 read out to vertical signal line 220 in each column with the reference signal having ramp voltage that changes stepwise. More specifically, comparator 202 compares the ramp voltage generated by ramp generation circuit 204 that is output to ramp signal line 230 via ramp buffer 203 with the analog signal output from unit cell 200 for each row via vertical signal line 220. Counter 206 counts a period of comparison by comparator 202. The analog signal from unit cell 200 is converted to digital data, and this is output to latch circuit 207.

The above A/D conversion takes place twice for single reading of unit cell 200. In one unit cell 200, a high-level signal is applied to reset signal line 260. This turns on reset transistor 241 to reset potential of floating diffusion 246. Next, a high-level voltage is applied to selection signal line 280. This turns on selection transistor 244, and outputs a reset potential of floating diffusion 246 to vertical signal line 220. Then, a high-level signal is applied to transfer signal line 270. This turns on transfer transistor 242, and electric charge accumulated in photo diode 245 by incident light is transferred to floating diffusion 246. Next, a high-level voltage is applied to selection signal line 280. This turns on selection transistor 244, and a signal potential of floating diffusion 246 is output to vertical signal line 220. The analog signal corresponding to the reset potential and the analog signal corresponding to the signal potential are A/D converted, and a difference in outputs after A/D conversion is processed in the A/D converter or outside to read out the pixel signal.

The pixel signal after A/D conversion is stored typically in latch circuit 207, and then selected by horizontal scan circuit 208 to be sequentially output to outside the chip. A control signal generated by timing control circuit 209 is input to ramp generation circuit 204, row selection circuit 205, counter 206, latch circuit 207, and horizontal scan circuit 208.

[Circuit Diagram of Ramp Buffer]

Figure 4:
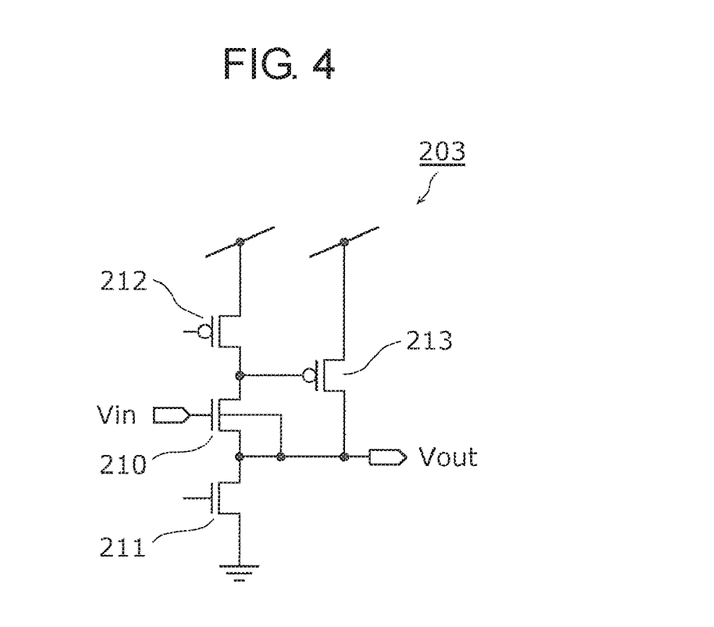
FIG. 4 is an example of a circuit diagram of a ramp buffer in accordance with the first exemplary embodiment.

Ramp buffer 203 configures a voltage amplifier with feedback circuit that controls the amount of current flowing in a ramp buffer output stage according to output voltage of ramp buffer 203. A negative feedback circuit in the ramp buffer output stage enables significant reduction of output impedance of ramp buffer 203 without increasing current of the ramp buffer output stage.

FIG. 4 is an example of a circuit diagram of the ramp buffer in the first exemplary embodiment. Ramp buffer 203 shown in FIG. 4 configures a super source follower circuit as an example of achieving the above function. The super source follower circuit configured by ramp buffer 203 is described below.

In a normal NMOS source follower circuit used as an amplifier with single gain, input transistor 210 and current source load transistor 211 are disposed in series between the power source and GND. The gate of input transistor 210 is coupled to the input terminal of ramp buffer 203 where input voltage Vin is input. Bias voltage generated typically in a current mirror circuit is input to the gate of current source load transistor 211. Still more, a connecting point of the source of input transistor 210 and the drain of current source load transistor 211 is coupled to the output terminal of ramp buffer 203, and potential at the connecting point is output as output voltage Vout.

In the normal source follower circuit, as described above, configured with input transistor 210, current source load transistor 211, the input terminal, and the output terminal, output impedance of ramp buffer 203 can be reduced by increasing the current flowing to the source follower. However, this needs to enlarge element size in line with increased current consumption and current density, which in turn may enlarge the area of ramp buffer.

Conversely, the super source follower circuit of ramp buffer 203 in the exemplary embodiment includes current source transistor 212 configured with PMOS transistor, and feedback transistor 213 configured with PMOS transistor, in addition to the above source follower circuit. More specifically, the source of current source transistor 212 is coupled to the power source, and the drain is coupled to the drain of input transistor 210. The source of feedback transistor 213 is coupled to the power source, and the gate is coupled to the drain of current source transistor 212 and the drain of input transistor 210. The drain is coupled to the output terminal of ramp buffer 203. With the above connecting configuration, current source transistor 212 and feedback transistor 213 configure a feedback circuit.

The above configuration increases voltage between the gate and source of input transistor 210 when output voltage Vout decreases, and thus current flowing to input transistor 210 increases. This decreases the drain voltage of input transistor 210. Voltage between the gate and source of feedback transistor 213 therefore increases. Accordingly, the current flowing to feedback transistor 213 increases, but feedback transistor 213 applies current according to reduction of current in current source load transistor 211, so as to suppress fluctuation of output voltage Vout. Here, output impedance Rout of ramp buffer 203 can be approximated by output impedance rin and transconductance gmin of input transistor 210 and transconductance gmfb of feedback transistor 213, as shown in the following Formula 1.

$$R_{Out} \approx \frac{1}{(g\min \cdot gmfb \cdot rin)} \quad [\text{Formula 1}]$$

The ramp buffer configured only with the source follower circuit reduces output impedance by increasing current flowing to the source follower circuit. Conversely, ramp buffer 203 in the exemplary embodiment can reduce output impedance by transconductance gmfb of feedback transistor 213, as shown in the above Formula 1.

The above exemplary embodiment is described based on the NMOS source follower circuit. However, the same applies to a PMOS source follower configuration.

As described above, solid-state imaging device 102 in the exemplary embodiment can drastically reduce impedance between ramp generation circuit 204 and the input end of comparator 202 without increasing current consumption by providing ramp buffer 203 with the above configuration. Accordingly, streaking can be reduced without increasing power consumption.

Furthermore, in the solid-state imaging device in the exemplary embodiment, ramp buffer 203 or both ramp buffers 203 and ramp generation circuit 204 may be provided to the left and right of single ramp signal line 230. These configurations are also included in the present invention. Impedance can be further reduced by driving ramp signal line 230 on both sides.

Second Exemplary Embodiment

A solid-state imaging device in the second exemplary embodiment has a configuration of a CMOS image sensor of single slope column-parallel A/D conversion type, same as the solid-state imaging device in the first exemplary embodiment.

[Configuration of Solid-State Imaging Device]

Figure 5:
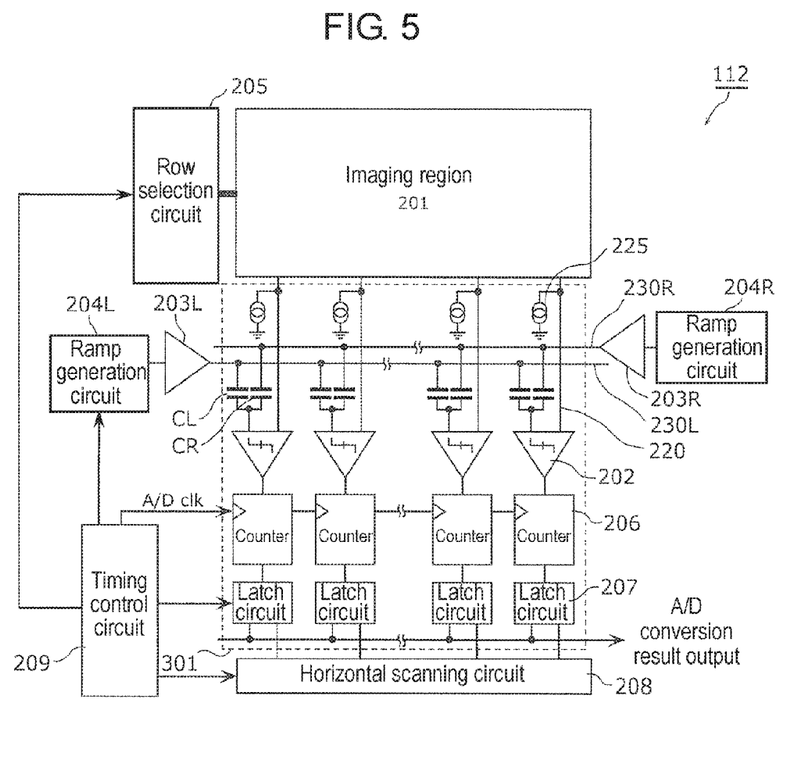
FIG. 5 is a block diagram of a solid-state imaging device in accordance with a second exemplary embodiment.

FIG. 5 is a block diagram of the solid-state imaging device in the second exemplary embodiment. As shown in FIG. 5, solid-state imaging device 112 includes imaging region 201, vertical signal line 220, comparator 202, load current source 225, capacitances CL and CR, ramp buffers 203L and 203R, ramp generation circuits 204L and 204R, row selection circuit 205, counter 206, latch circuit 207, horizontal scan circuit 208, and timing control circuit 209. Solid-state imaging device 112 in FIG. 5 differs from solid-state imaging device 102 in the first exemplary embodiment shown in FIG. 2 with respect to provision of multiple ramp generation circuits and ramp buffers. Solid-state imaging device 112 in the exemplary embodiment is described below mainly different points and omitting the points same as that of solid-state imaging device 102 in the first exemplary embodiment.

A second input terminal, which is one of two input terminals of comparator 202, is coupled to vertical signal line 220 transmitting signals from unit cell 200, and a first input terminal, which is the other input terminal, is coupled to ramp signal lines 230L and 230R via capacitances CL and CR, respectively. Ramp signal line 230L, which is a first ramp signal line, is coupled to ramp buffer 203L, which is a first buffer circuit. On the other hand, ramp signal line 230R, which is a second ramp signal line, is coupled to ramp buffer 203R, which is a second buffer circuit. Ramp generation circuits 204L and 204R are coupled to ramp buffers 203L and 203R, respectively.

In the above configuration, a reference signal having ramp voltage is applied to one A/D converter 301 from its right and left. Specifically, the reference signal is input to the first input terminal of comparator 202 via capacitance CL or CR. In other words, an average voltage of ramp voltages applies from the right and left is input to the first input terminal of comparator 202.

This configuration disperses voltage fluctuation of ramp signal line due to reverse operation of comparator 202 to half by two capacitances CL and CR. In other words, an effect of the operation of comparator 202 on the ramp signal line reduces, enabling to reduce streaking.

On assumption that the reference signal is applied from one side of the A/D converter, a load seen from the ramp buffer depends on a horizontal position of the ramp signal line due to wiring resistance, parasitic capacitance, and input capacitance of the comparator. Accordingly, the load seen from the ramp buffer has the largest difference at the left and right ends of the ramp signal line, and has a gradient. In the above single-sided driving, a streaking level of a shading image has horizontal gradient due to this load gradient. This shading of streaking degrades an image impression, same as streaking. The shading of streaking is reduced by both-sided driving. However, if the horizontal size of imaging region is enlarged, a load difference nearest to the ramp buffer and at the center becomes large, and thus the image impression degrades.

Contrarily, in solid-state imaging device 112 in the exemplary embodiment, the reference signal is applied from both right and left sides of A/D converter 301, and right and left ramp signal lines 230R and 230L and comparator 202 are capacitive-coupled via capacitances CR and CL, respectively. This averages effective load that can be seen from ramp buffers 203L and 203R at each point of the ramp signal line. Accordingly, shading of streaking is improved in addition to suppression of streaking.

[Comparison of Streaking]

A streaking level is compared between that in the both-sided driving system using capacitive coupling as in the exemplary embodiment and that in a simple both-sided driving system without capacitive coupling. For simplification, resistance from ramp buffers 203L and 203R to nearest comparator 202 is ignored, and streaking is supposed to depend only on a resistance component and capacitive component due to series resistance load and grounding capacitive load in each column seen from the ramp buffer. The number of pixels in the horizontal direction is Nz, wiring resistance of ramp signal line corresponding to one comparator 202 is R, and input capacitance of comparator 202 is C. Under these conditions, load resistance Redge and load capacitance Cedge seen at the ramp buffer edge, and load resistance Rmid and load capacitance Cmid at the column center are obtained.

First, in the simple both-sided driving system without capacitive coupling, effective load will be halved by coupling two ramp buffers to one ramp signal line. Accordingly, load resistance Redge, load capacitance Cedge, load resistance Rmid, and load capacitance Cmid will be as follows in Formula 2 and Formula 3.

$$R_{edge}=0$$

$$C_{edge}=Nx \cdot C/2 \quad \text{[Formula 2]}$$

$$R_{mid}=Nx \cdot R/4$$

$$C_{mid}=Nx \cdot C/4 \quad \text{[Formula 3]}$$

On the other hand, the both-sided driving system using capacitive coupling needs two ramp signal lines in the same area as a simple both-sided driving system without capacitive coupling and two capacitances in the region corresponding to one comparator 202. Therefore, wiring resistance R and input capacitance C are doubled, and effective load is averaged by capacitive coupling. Accordingly, load resistance Redge, load capacitance Cedge, load resistance Rmid, and load capacitance Cmid will be as follows in Formula 4 and Formula 5.

$$R_{edge} = (0 + Nx \cdot 2R)/2 = Nx \cdot R \quad \text{[Formula 4]}$$
$$C_{edge} = (0 + Nx \cdot 2C)/2 = Nx \cdot C$$

$$R_{mid} = \left(\frac{Nx}{2} \cdot 2R\right) \cdot 2/2 = Nx \cdot R \quad \text{[Formula 5]}$$
$$C_{mid} = \left(\frac{Nx}{2} \cdot 2C\right) \cdot 2/2 = Nx \cdot C$$

It is apparent from the above Formula 4 and Formula 5 that the both-sided driving system with capacitive coupling achieves constant load seen from the ramp buffer without being dependent on a column, and thus shading of streaking is suppressed.

In the exemplary embodiment, random noise generated by the ramp buffer relative to input of the comparator is doubled by both-sided driving. However, outputs of two ramp buffers 203L and 203R are coupled via capacitances CL and CR, respectively. This can thus reduce random noise of the ramp buffer by $1/\sqrt{2}$ by an averaging effect.

Still more, since the reference signal is applied from left and right to one A/D converter 301 and the reference signal is applied to the comparator via capacitances CL and CR, there is no need to match a DC level and gradient of ramp voltage of left and right ramp generation circuits. Tolerance to process variations is also high. In the exemplary embodiment, capacitance values of capacitances CL and CR are considered equivalent, in order to match gradients of ramp voltage (gains) generated in left and right ramp generation circuits 204L and 204R.

Modified Example

Figure 6:
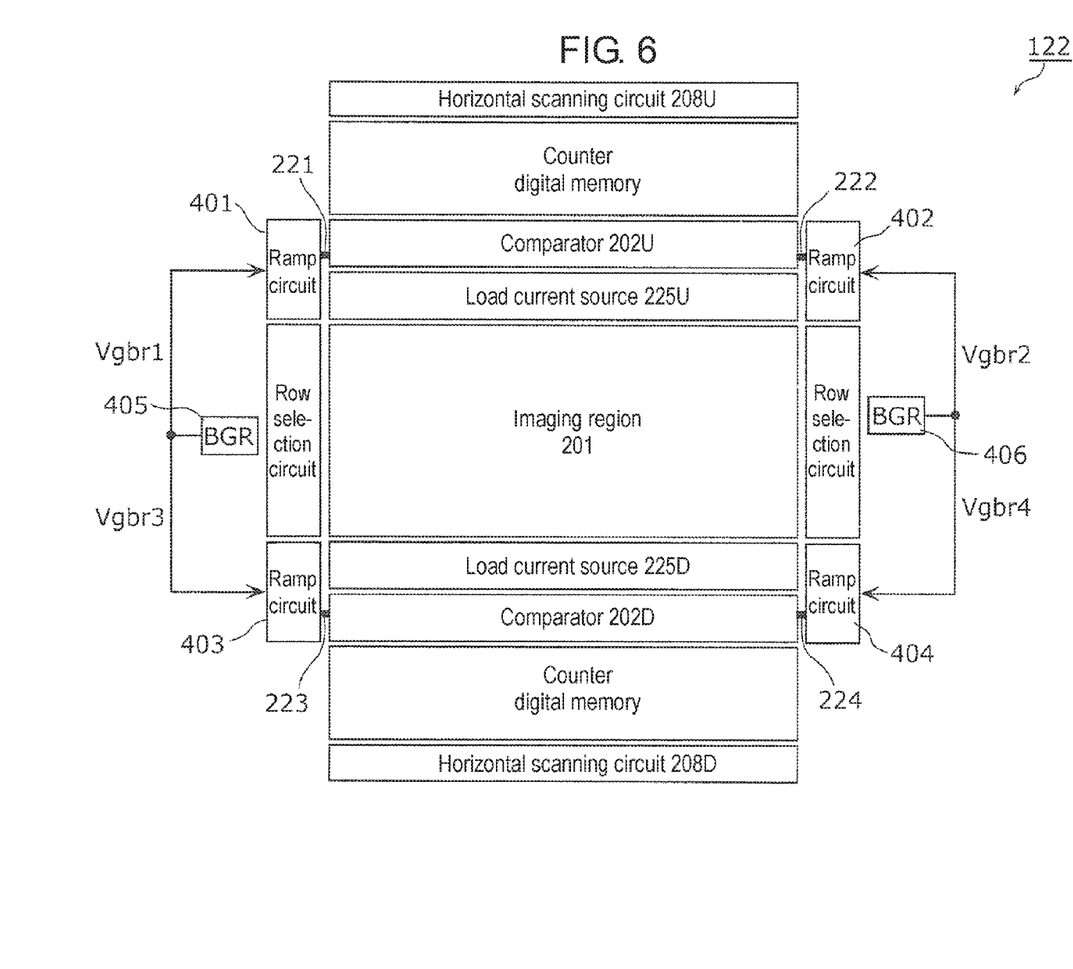
FIG. 6 is a layout illustrating a floor plan of a modified example of the solid-state imaging device in accordance with the second exemplary embodiment.

FIG. 6 is a layout illustrating a floor plan of a modified example of the solid-state imaging device in the second exemplary embodiment.

As shown in FIG. 6, in solid-state imaging device 122 in the modified example, the ramp circuits 401, 402, 403, and 404 configured with a ramp buffer or ramp buffer and ramp generation circuit are disposed to the left and right so that they are adjacent to comparators 202U and 202D disposed on the top and bottom of imaging region 201. In other words, multiple ramp buffers are provided. Each of multiple comparators 202 simultaneously receive ramp voltage supply from ramp buffers 203L and 203R disposed in plural number. This can reduce wiring impedance of ramp signal lines 221, 222, 223, and 224 from the ramp buffers to input ends of comparators, enabling further reduction of streaking. In this case, reference voltage generation circuits (BGR) 405 and 406 that supply reference voltage or reference current to ramp circuits 401 to 404. The reference voltage generation circuits (BGR) 405 is preferably disposed around the middle of ramp circuits 401 and 403. The reference voltage generation circuits (BGR) 406 is preferably disposed around the middle of ramp circuits 402 and 404. This achieves the same wiring length and wiring load for wiring Vbgr1 connecting BGR 405 and ramp circuit 401 and wiring Vbgr3 connecting BGR 405 and ramp circuit 403 and the same wiring length and wiring load for wiring Vbgr2 connecting BGR 406 and ramp circuit 402 and wiring Vbgr4 connecting BGR 406 and ramp circuit 404. Still more, equivalent wiring length and wiring load for Vbgr1 to Vbgr4 enables to enhance uniformity of DC voltage and gradient of each ramp voltage.

As described above, solid-state imaging device 112 in the exemplary embodiment can suppress streaking and also reduce shading of streaking by reducing impedance between the ramp generation circuit and the input terminal of comparator. The exemplary embodiment further achieves effects of improving the picture quality by reduced noise and suppressed variations in characteristics (tolerance to process variations) of the reference signal applied from the left and right.

Furthermore, the configuration of solid-state imaging device 112 in the exemplary embodiment is also applicable to a configuration having two A/D converters for imaging region 201, other than a configuration of applying the reference signal from left and right to one A/D converter, as in the modified example of solid-state imaging device 122. In other words, solid-state imaging device 122 is configured to have a ramp generation circuit and ramp buffer in multiple regions, such as top, bottom, left, and right of imaging region 201. These configurations are also included in the present invention as modified examples of the second exemplary embodiment.

Ramp buffers included in solid-state imaging devices 112 and 122 in the exemplary embodiments may not have a feedback circuit such as a super source follower circuit. For example, the ramp buffer may be configured with a source follower circuit. Also in this case, effective wiring impedance and output impedance of ramp buffer are reduced to enable reduction of wiring load by using multiple ramp buffers to simultaneously drive the inputs of all comparators belonging to one A/D converter. Accordingly, streaking is suppressed.

Third Exemplary Embodiment

A solid-state imaging device in the third exemplary embodiment has a configuration of a CMOS image sensor of single slope column-parallel A/D conversion type, same as the solid-state imaging device in the first exemplary embodiment.

[Configuration of Solid-State Imaging Device]

Figure 7:
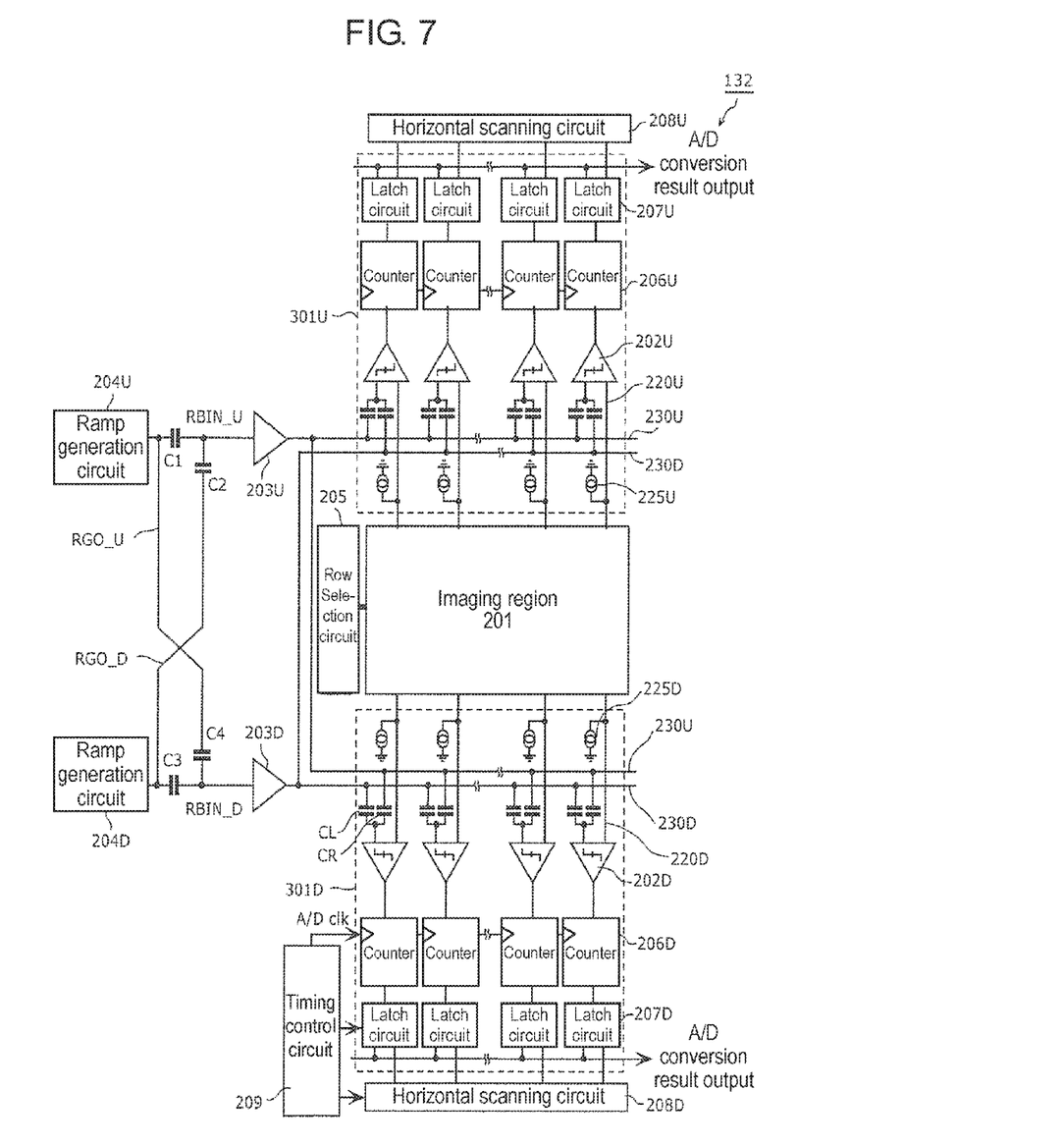
FIG. 7 is a block diagram of a solid-state imaging device in accordance with a third exemplary embodiment.

FIG. 7 is a block diagram of the solid-state imaging device in the third exemplary embodiment. As shown in FIG. 7, solid-state imaging device 132 includes imaging region 201, A/D converters 301U and 301D, ramp buffers 203U and 203D, ramp generation circuits 204U and 204D, row selection circuit 205, horizontal scan circuits 208U and 208D, and timing control circuit 209. Each of A/D converters 301U and 301D has the same configuration as A/D converter 301 in the second exemplary embodiment. A/D converter 301U is disposed in an upper region of imaging region 201, and includes comparator 202U, vertical signal line 220U, load current source 225U, capacitances CL and CR, counter 206U, and latch circuit 207U. A/D converter 301D is disposed in a lower region of imaging region 201, and includes comparator 202D, vertical signal line 220D, load current source 225D, capacitances CL and CR, counter 206D, and latch circuit 207D.

Ramp signal lines 230U and 230D are coupled to comparator 202U in each column via capacitances CL and CR. Ramp buffers 203U and 203D are also coupled to ramp signal lines 230U and 230D, respectively. Ramp signal lines 230U and 230D are also coupled to comparator 202D in each column via capacitances CL and CR. Ramp buffers 203U and 203D are coupled to ramp signal lines 230U and 230D, respectively.

An input terminal of ramp buffer 203U is coupled to an output terminal of ramp generation circuit 204U via capacitance C1, and an output terminal of ramp generation circuit 204D via capacitance C2. An input terminal of ramp buffer 203D is coupled to an output terminal of ramp generation circuit 204U via capacitance C4, and an output terminal of ramp generation circuit 24D via capacitance C3. In other words, ramp generation circuits 204U and 204D and buffer circuits 203U and 203D are coupled via capacitive elements C1 to C4.

In the above configuration, ramp wiring is coupled to the A/D converters disposed on the top and bottom from one ramp buffer. In the A/D converter, the output terminals of ramp buffers 203U and 203D are coupled to the first input terminals of comparators 202U and 202D via capacitances CL and CR.

With the above configuration, output signal RGO_U of ramp generation circuit 204U is supplied as input signal RBIN_U of ramp buffer 203U via capacitance C1, and as input signal RBIN_D of ramp buffer 203D via capacitance C4. In the same way, output signal RGO_D of ramp generation circuit 204D is supplied as input signal RBIN_U of ramp buffer 203U via capacitance C2 and input signal RBIN_D of ramp buffer 203D via capacitance C3.

In other words, in the configuration of solid-state imaging device 132 shown in FIG. 7, at least ramp buffer or ramp generation circuit is disposed in plural number. In addition, the first input terminals of all comparators 202U and 202D belonging to A/D converters 301U and 301D are coupled to the output terminal of ramp buffer 203U by common ramp signal line 230U. The first input terminals of all comparators 202U and 202D belonging to A/D converters 301U and 301D are coupled to the output terminal of ramp buffer 203D by common ramp signal line 230D.

As the size of imaging region 201 increases, typically due to an image sensor using higher pixel counts and large pixels, a layout distance between ramp generation circuits 204U and 204D becomes larger. Therefore, in general, variations in circuit characteristics due to manufacturing processes become large. However, in the configuration of the solid-state imaging device 132 in the above exemplary embodiment, two ramp generation circuits disposed at the top and bottom and ramp buffer are cross-coupled via capacitances C1 to C4. Therefore, characteristic differences in DC voltage and gradient of two ramp generation circuits 204U and 204D are averaged.

In the above configuration, a wiring length of ramp signal line 230 coupling ramp buffer 203U and comparator 202U in upper column (upper region) and a wiring length of ramp signal line 230U coupling ramp buffer 203U and comparator 202D in lower column (lower region) differ. Therefore, a difference in ramp characteristics, such as DC voltage and gradient of ramp signal, occurs, but this difference in ramp characteristics applied to upper and lower ramp signal lines 230U is canceled by connection via capacitances CR and CL. This is same for ramp signal line 230D coupled to ramp buffer 203D. Accordingly, degradation of the picture quality due to a difference in ramp characteristics can be prevented in the configuration where multiple ramp signals are used as the reference voltage of column-parallel ADC.

In aforementioned imaging device in FIG. 1, solid-state imaging devices 112 and 122, in the second exemplary embodiment and solid-state imaging device 132 in the third exemplary embodiment are applicable instead of solid-state imaging device 102.

Summary

As described above with reference to drawings, the disclosed technology offers a solid-state imaging device and an imaging device that can reduce streaking by reducing impedance between the ramp generation circuit and comparator, so as to improve picture quality.

The solid-state imaging device in the disclosure executes column-parallel A/D conversion of analog signals output from multiple pixels aligned in two-dimensional matrix. More specifically, a ramp buffer that outputs a reference signal having ramp voltage is coupled between the ramp generation circuit and multiple comparators. The ramp buffer has a feedback circuit for controlling the amount of current flowing to the output terminal according to the output voltage. This enables to reduce output impedance of the ramp buffer. The ramp buffer demonstrates a high effect of reducing output impedance of ramp buffer, compared to a ramp buffer without the above feedback circuit. Accordingly, streaking can be reduced while suppressing increased current and area.

Still more, inputs of all comparators belonging to one A/D converter are simultaneously driven by at least multiple ramp generation circuits or multiple ramp buffers. In other words, the input terminals of the comparators and the output terminals of the buffer circuits are coupled by a common ramp signal line. This enables to reduce effective wiring impedance and output impedance of ramp buffer. Accordingly, wiring load is reduced, and therefore streaking is suppressed.

Still more, the output terminals of the ramp buffers and the input terminals of the comparators are coupled via capacitance. This can improve shading phenomenon of streaking. In addition, noise can be reduced and a difference in characteristics between the ramp generation circuits can be averaged.

Still more, from the viewpoint of layout around imaging region 201, the ramp generation circuit and ramp buffer or one of them is disposed adjacent to the comparator. This enables to shorten the ramp signal line coupled to the comparator. Accordingly, wiring impedance between the ramp generation circuit and comparator can be reduced.

Still more, each of the output terminals of the ramp generation circuits and each of the input terminals of the ramp buffers are coupled via a capacitive element. This enables to reduce the effect of variations in characteristics between the ramp generation circuits.

The solid-state imaging device and imaging device of the present invention are not limited to the above exemplary embodiments. Other exemplary embodiments achieved by combining any component in each exemplary embodiment, a range of modifications relative to each exemplary embodiment that others can think of within the scope of the intention of the present invention, and a range of apparatuses equipped with the solid-state imagining device of the present invention are embraced therein.

For example, the above first to third exemplary embodiments have digital configuration in which a counter is provided in each column to supply a counter clock and stop the counting operation of each column at an inversion timing of the output from each comparator. However, the present invention is not limited to this configuration. A common counter may be provided outside of column arrays, and each column is provided with a memory or latch for A/D conversion to commonly distribute a counting value from the common counter to all columns. Digital configuration may be achieved by latching a counting value of each column at the inversion timing of the output of each comparator.

Still more, unit cell 200 may be configured to select pixels at floating diffusion potential without using a selection transistor. A reset transistor and source follower transistor may also be shared among multiple pixels.

The first to third exemplary embodiments describe the type that refers to the ramp signal of single slope column-parallel A/D conversion. However, the same effect is achievable with column A/D conversion that supplies and uses reference voltage to all columns (e.g., successive comparison type A/D conversion).

INDUSTRIAL APPLICABILITY

The present invention can improve streaking characteristic during imaging while suppressing power consumption. In particular, the present invention is effectively applicable to CMOS solid-state imaging devices, digital still cameras, camcorders, mobile phones with camera, and monitoring cameras.

REFERENCE MARKS IN THE DRAWINGS

| | |
|---|---|
| 101 | Lens |
| 102, 112, 122, 132, 500 | Solid-state imaging device |
| 103 | Camera signal processor |
| 104 | System controller |
| 200 | Unit cell |
| 201, 510 | Imaging region |
| 202, 202D, 202U, 551 | Comparator |
| 203, 203D, 203L, 203R, 203U | Ramp buffer |
| 204, 204D, 204L, 204R, 204U | Ramp generation circuit |
| 205, 520 | Row selection circuit |
| 206, 206D, 206U, 552 | Counter |
| 207, 207D, 207U, 553 | Latch circuit |
| 208, 208D, 208U, 530 | Horizontal scan circuit |
| 209, 540 | Timing control circuit |
| 210 | Input transistor |
| 211 | Current source load transistor |
| 212 | Current source transistor |
| 213 | Feedback transistor |
| 220, 554 | Vertical signal line |
| 221, 222, 223, 224, 230, 230D, 230L, 230R, 230U, 555 | Ramp signal line |
| 225, 225D, 225U | Load current source |
| 241 | Reset transistor |
| 242 | Transfer transistor |
| 243 | Source follower transistor |
| 244 | Selection transistor |
| 245 | Photo diode |
| 246 | Floating diffusion |
| 250 | Source signal line |
| 260 | Reset signal line |
| 270 | Transfer signal line |
| 280 | Selection signal line |
| 301, 301D, 301U | A/D converter |
| 401, 402, 403, 404 | Ramp circuit |
| 405, 406 | Reference voltage generation circuit (BGR) |
| 550 | ADC group |
| 560 | Digital-analog converter (DAC) |
| 570 | Amplifier circuit |
| 580 | Signal processing circuit |
| 590 | Horizontal transfer line |

The invention claimed is:

1. A solid-state imaging device comprising:
a pixel section in which a plurality of pixels for conducting photoelectric conversion are arranged in matrix;
an A/D converter for converting a pixel signal generated in the pixel section from an analog signal to a digital signal in a plurality of pixel units;
a ramp generation circuit for generating ramp voltage; and
a buffer circuit having an input terminal and an output terminal, the ramp voltage generated in the ramp generation circuit being input to the input terminal and a reference signal having the ramp voltage being output from the output terminal toward the A/D converter,
wherein
the A/D converter includes:
a comparator disposed in each pixel column for comparing the analog signal of each pixel in the plurality of pixels with the reference signal, the comparator having a first input terminal to which the reference signal is input and a second input terminal to which the analog signal is input; and
a counter latch disposed corresponding to the comparator, the counter latch counting a period of comparison of the analog signal and the reference signal by the comparator, and retaining the digital signal corresponding to the period,
at least the buffer circuit or the ramp generation circuit is provided in plural number,
the first input terminal is coupled to a plurality of ramp signal lines, and
the reference signal generated from the buffer circuit and the ramp generation circuit is input to the first input terminal from the plurality of ramp signal lines.

2. The solid-state imaging device of claim 1,
wherein
the plurality of ramp signal lines include a first ramp signal line coupling an output terminal of a first buffer circuit and the first input terminal and a second ramp signal line coupling an output terminal of a second buffer circuit and the first input terminal, and
the A/D converter further includes:
a first capacitive element inserted in series between the first ramp signal line and the first input terminal; and
a second capacitive element inserted in series between the second ramp signal line and the first input terminal.

3. An imaging device comprising:
the solid-state imaging device of claim 1; and
an optical system for forming an image of a subject on the pixel section.

4. The solid-state imaging device of claim 1,
wherein
the buffer circuit includes a feedback circuit for simultaneously outputting the reference signal to a plurality of the comparator, and controlling an amount of current flowing to the output terminal according to the ramp voltage of the reference signal output from the output terminal.

5. The solid-state imaging device of claim 4,
wherein
the buffer circuit includes:
an n-type input transistor having a gate coupled to the input terminal of the buffer circuit and a source coupled to the output terminal of the buffer circuit,
an n-type current source load transistor having a drain coupled to the source of the input transistor and a source that is grounded,
a p-type current source transistor having a source coupled to a power source and a drain coupled to the drain of the input transistor, and
a p-type feedback transistor having a gate coupled to the drain of the input transistor, a source coupled to the power source, and a drain coupled to the output terminal of the buffer circuit,
a source follower circuit is configured with the input transistor and the current source load transistor, and
the feedback circuit is configured with the current source transistor and the feedback transistor.

6. The solid-state imaging device of claim 4,
wherein
the buffer circuit is disposed adjacent to the comparator.

7. The solid-state imaging device of claim 1,
wherein
the first input terminal and the output terminal of the buffer circuit are coupled by the ramp signal lines in common.

8. The solid-state imaging device of claim 7,
wherein
the buffer circuit includes a feedback circuit for controlling an amount of current flowing to the output terminal according to the ramp voltage of the reference signal output from the output terminal.

9. The solid-state imaging device of claim 7,
wherein
the comparator has a first input terminal to which the reference signal is input and a second input terminal to which the analog signal is input, and
the solid-state imaging device further includes:
a first ramp signal line coupling an output terminal of a first buffer circuit and the first input terminal of the comparator,
a second ramp signal line for coupling an output terminal of a second buffer circuit and the first input terminal of the comparator,
a first capacitive element inserted in series between the first ramp signal line and the first input terminal of the comparator, and
a second capacitive element inserted in series between the second ramp signal line and the first input terminal of the comparator.

10. The solid-state imaging device of claim 7,
wherein
the ramp generation circuit and the buffer circuit are coupled via a capacitive element.

* * * * *